US006460440B1

United States Patent
Tsune

(10) Patent No.: US 6,460,440 B1
(45) Date of Patent: Oct. 8, 2002

(54) CUTTING APPARATUS

(75) Inventor: Yoshitaka Tsune, Toyama-ken (JP)

(73) Assignee: Tsune Seiki Co., Ltd., Toyama-Ken (JP)

( * ) Notice: Subject to any disclaimer, the term of this patent is extended or adjusted under 35 U.S.C. 154(b) by 0 days.

(21) Appl. No.: 09/573,721

(22) Filed: May 18, 2000

(30) Foreign Application Priority Data

Apr. 17, 2000 (JP) ........................................ 2000-115541

(51) Int. Cl.⁷ .................................................. B26D 7/06
(52) U.S. Cl. ............................... 83/153; 83/277; 83/720
(58) Field of Search ........................... 83/703, 42, 720, 83/721, 424, 594, 595, 151, 206, 466.1, 435.11, 723–726, 452–453, 426, 704, 277

(56) References Cited

U.S. PATENT DOCUMENTS

| | | | | |
|---|---|---|---|---|
| 3,057,240 A | * | 10/1962 | De Witt ........................ 269/246 |
| 3,686,990 A | * | 8/1972 | Margolien .................... 83/409 |
| 3,692,219 A | * | 9/1972 | Franks ........................ 225/101 |
| 4,048,833 A | * | 9/1977 | Lorenz ........................ 226/112 |
| 4,205,569 A | * | 6/1980 | Horn et al. .................... 83/157 |
| 4,252,040 A | * | 2/1981 | Kiefer ........................ 83/153 |
| 4,543,868 A | * | 10/1985 | Maurer et al. ................ 269/54 |
| 4,781,092 A | * | 11/1988 | Gaiser ........................ 83/153 |
| 4,785,699 A | * | 11/1988 | Oblinger et al. .............. 83/422 |
| 5,060,547 A | * | 10/1991 | Moriya et al. ................ 83/210 |
| 5,088,364 A | * | 2/1992 | Stolzer ........................ 83/153 |
| 5,224,407 A | * | 7/1993 | Koch et al. .................... 83/42 |
| 5,239,905 A | * | 8/1993 | Dunn ........................ 269/126 |

* cited by examiner

Primary Examiner—M. Rachuba
Assistant Examiner—Jason Prone
(74) Attorney, Agent, or Firm—Schweitzer Cornman Gross & Bondell LLP

(57) ABSTRACT

A cutting apparatus can make a length of a remainder material of a work as short as possible and can use one work effectively. The cutting apparatus has a main stock vice mechanism holding a work to be cut at upstream side and downstream side of a cutting position for cutting the work by means of a saw blade, a work feeding stock vice mechanism holding the work toward the cutting position for feeding per a predetermined cutting length, and a work drawing mechanism active when a difference between a length of a remainder material of the work and a feed limit length of the remainder material by the work feeding stock vice mechanism becomes shorter than a preliminarily set cutting length of the work. The work drawing mechanism holds a tip end of the remainder material at a predetermined position on downstream side of the cutting position or on upstream side of the cutting position for drawing the remainder material to extend a predetermined length from the cutting position.

6 Claims, 7 Drawing Sheets

CUTTING APPARATUS

BACKGROUND OF THE INVENTION

The present invention relate to a cutting apparatus having a main stock vice mechanism holding a material to be cut (hereinafter referred to as "work") at upstream side and downstream side of a cutting position for cutting the work by means of a saw blade, and a work feeding stock vice mechanism holding the work for transporting across the cutting position, for transporting the work, such as a steel rod, steel pipe and so forth, per a preliminarily set cutting length by the work feeding stock vice mechanism, and performing cutting sequentially.

DESCRIPTION OF THE RELATED ART

FIG. 11A is a general plan view of the conventional circular saw cutting machine, and FIG. 11B is a right side view of the cutting machine of FIG. 11A. In FIGS. 11A and 11B, the reference numeral 1 denotes a main stock vice mechanism holding a work W at upstream side and downstream side of a cutting position P where the work is cut by means of a saw blade 2. The main stock vice mechanism 1 is constructed with a pair of stationary stock vices 1a provided on a base 3 at both sides of the cutting position P, a bifurcated movable stock vice 1b movable toward and away from the stationary stock vices 1a in horizontal direction, a hydraulic cylinder 1c for driving the movable stock vice 1b and a vertical stock vice 1d driven up and down by other cylinder. The reference numeral 4 denotes a work feeding stock vice mechanism for holding the work W to transport across the cutting position P. The work feeding stock vice mechanism 4 is constructed with a reciprocating base 5 reciprocating between a forward end position in the vicinity of the cutting position P and a retracted end position located rear side of the forward end position, along a work feeding base 6, stationary stock vice 4a mounted on the reciprocating base 5, a movable stock vice 4b and a hydraulic cylinder 4c driving the movable stock vice 4b.

However, the cutting apparatus holds the work W, such as a steel rod or the like by means of a main stock vice mechanism 1. Upon initiation of cutting operation, unnecessary end material portion at the tip end of the work W is cut by means of saw blade 2. Thus, with talking a cut end face as reference, the work W is fed for a preliminarily set cutting length L (see FIG. 12) by means of the work feeding stock vice mechanism 4 to cut as shown by one-dotted line by the saw blade 2 at the cutting position P into a cut work Wa of the predetermined length L. After cutting, the work feeding stock vice mechanism 4 is retracted. From the retracted position, the work W is again fed for the predetermined length by the work feeding stock vice mechanism 4 to cut by the saw blade 2. By repeatedly performing the foregoing operation, one work W is sized into the cut works Wa.

In use of the cutting machine, one work W set forth above is sequentially cut by the saw blade 2 with feeding for a predetermined length L by the work feeding stock vice mechanism 4. Near the end of cutting of one work W, a remainder material Wr which can not be fed any further by the work feeding stock vice mechanism 4, is left as shown in FIG. 11. Namely, every time of completion of cutting by the saw blade 2, the work feeding stock vice mechanism 4 is retracted to a predetermined retracted position to hold the work W to transport the work for a cutting length L corresponding to a distance from the retracted position to a forward end position located at the upstream side of the cutting position P. Between the forward end position of the work feeding stock vice mechanism 4 and the cutting position P, there is an inherent given distance by interposition of the main stock vice mechanism 1. On the other hand, on the side of the work feeding stock vice mechanism 4, a predetermined width S is required as holding margin of the stationary stock vice 4a and the movable stock vice 4b for the work W. Shortening of the length of the remainder material Wr according to progress of cutting, the remainder material Wr can not be fed by the work feeding stock vice mechanism 4 any further. The length of the remainder material Wr which cannot be fed by the work feeding stock vice mechanism 4 any further, namely a feeding limit length $L_{min}$ may be slightly different depending upon the size of the cutting apparatus or arrangement of the main stock vice mechanism 1.

However, when a difference between the remainder material length Lr of the work W and the feeding limit length $L_{min}$ for enabling the work feeding stock vice mechanism 4 to feed the remainder material Wr becomes shorter than the cutting length L of the work, cutting cannot be performed any more. Therefore, in spite of the fact that the remainder material Wr has a length to be cut at least once, it should be disposed as crop. This point will be particularly discussed with reference to FIG. 12. Assuming that the feeding limit length $L_{min}$ of the work feeding stock vice mechanism 4 is 55 mm, the current length L of the work is 30 mm and the remainder material length Lr of the work W is 75 mm, if attempt is made to feed the remainder material Wr in the shown condition for 30 mm by the work feeding stock vice mechanism 4 for performing cutting for once, the work feeding stock vice mechanism 4 cannot be moved forward up to the position distanced from the cutting position P for 55 mm due to feeding limit length $L_{min}$. Then, the actual feed length n of the remainder material Wr becomes 20 mm which is shorted in the extent of 10 mm. Accordingly, the remainder material Wr has to be disposed while it has a length of 75 mm which can be cut for another one time.

SUMMARY OF THE INVENTION

The present invention has been worked out in view of the shortcoming of the prior art set forth above. It is, therefore, an object of the present invention to provide a cutting apparatus which can make a length of a remainder material of a work as short as possible and can use one work effectively.

Another object of the present invention is to provide a cutting apparatus which can draw a remainder material even when a difference between a length Lr of the remainder material Wr and a feel limit length $L_{min}$ of a work feeding stock vice mechanism becomes shorter than a cutting length L of the work ($L > Lr - L_{min}$), by a work drawing mechanism to draw in a predetermined length α ($= L - (Lr - L_{min})$) with holding the tip end of the remainder material at a position in the vicinity of a cutting position or upstream side of the cutting position, for permitting further cutting of the remainder material at the predetermined cutting length to minimize the length of the remainder material to be disposed as a crop and thus can use the one work quite efficiently.

According to the first aspect of the present invention, a cutting apparatus comprises:

a main stock vice mechanism holding a work to be cut at upstream side and downstream side of a cutting position for cutting the work by means of a saw blade;

a work feeding stock vice mechanism holding the work toward the cutting position for feeding per a predetermined cutting length; and a work drawing mechanism active when a difference between a length of a remainder material of the work and a feed limit length of the remainder material by the work feeding stock vice mechanism becomes shorter than a preliminarily set cutting length of the work, for holding a tip end of the remainder material at a predetermined position on downstream side of the cutting position or on upstream side of the cutting position for drawing the remainder material to extend a predetermined length from the cutting position.

With the construction set forth above, the remainder material of the work can be cut per the preliminarily set cutting length with leaving minimum length of the remainder material. Thus, one work can be used quite efficiently.

According to the second aspect of the present invention, a cutting apparatus comprises:

a main stock vice mechanism holding a work to be cut at upstream side and downstream side of a cutting position for cutting the work by means of a saw blade;

a work feeding stock vice mechanism holding the work toward the cutting position for sequentially feeding per a predetermined cutting length; and a work drawing mechanism active when a length of a remainder material of the work is shorter than a work feed limit of the work feeding mechanism and is sufficiently longer than the preliminarily set cutting length, for holding a tip end of the remainder material at a predetermined position on downstream side of the cutting position or on upstream side of the cutting position to extend the preliminarily set cutting length from the cutting position.

With the construction set forth above, the remainder material of the work can be cut per the preliminarily set cutting length with leaving minimum length of the remainder material. Thus, one work can be used quite efficiently.

In the preferred construction, the work drawing mechanism may comprise:

a movable frame provided therein a pair of holding members fir holding the work at both sides in diametrical direction and driving means for driving the holding members between a closed position holding the work and an open position where the work is released; and a movable frame driving means for driving the movable frame from downstream side position of the cutting position toward the cutting position, the movable frame being driven toward the cutting position to place the holding members at the predetermined position for holding the tip end of the remainder material.

With such construction of the work drawing mechanism, the cutting apparatus according to the present invention can be effectively implemented.

The pair of holding members of the work drawing mechanism may be arranged to obliquely oppose with each other at a position distant from a stationary stock vice of the main stock vice mechanism obliquely upward so as not to cause interference with the stationary stock vice upon holding the remainder material.

Since the holding members do not cause interference with the main stock vice mechanism, the holding members may be placed close to the cutting position across the position where the main stock vice mechanism is provided. Thus, the cutting apparatus set forth above can be effectively implemented.

The present invention will be understood more fully from the detailed description given hereinafter with reference to the accompanying drawings of the preferred embodiment of the present invention, which, however, should not be taken to be limitative to the present invention, but are for explanation and understanding only.

DESCRIPTION OF THE DRAWINGS

FIGS. 11A and 11B are illustration showing the conventional cutting apparatus, in which FIG. 11A is a general plan view of the conventional cutting apparatus and FIG. 11B is a right side elevation of the cutting apparatus of FIG. 11A.

DESCRIPTION OF A PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 11:
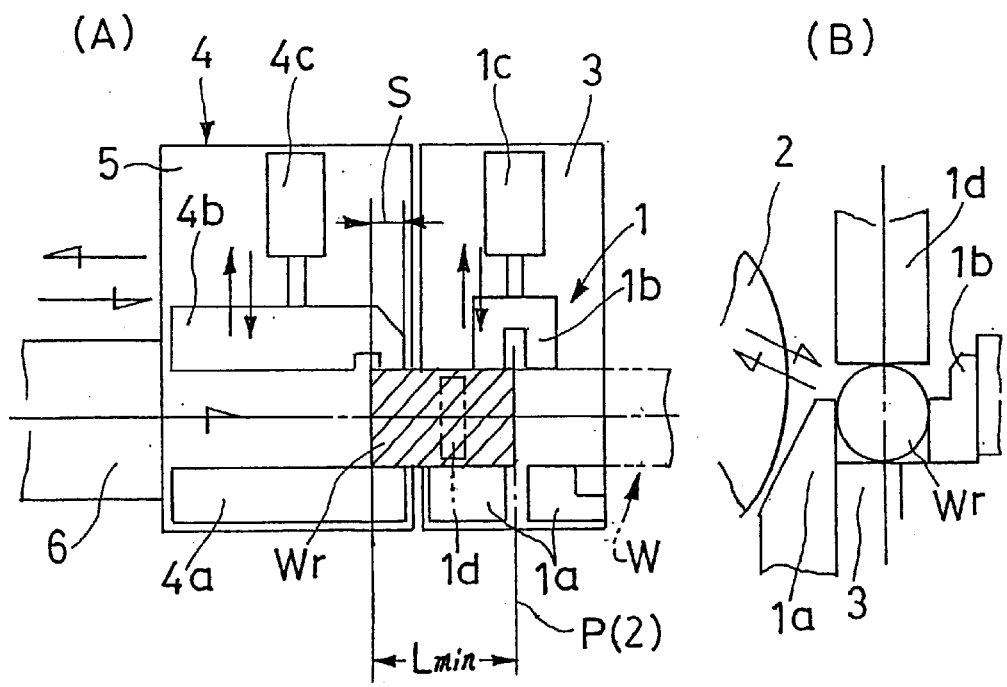
Figure 12:
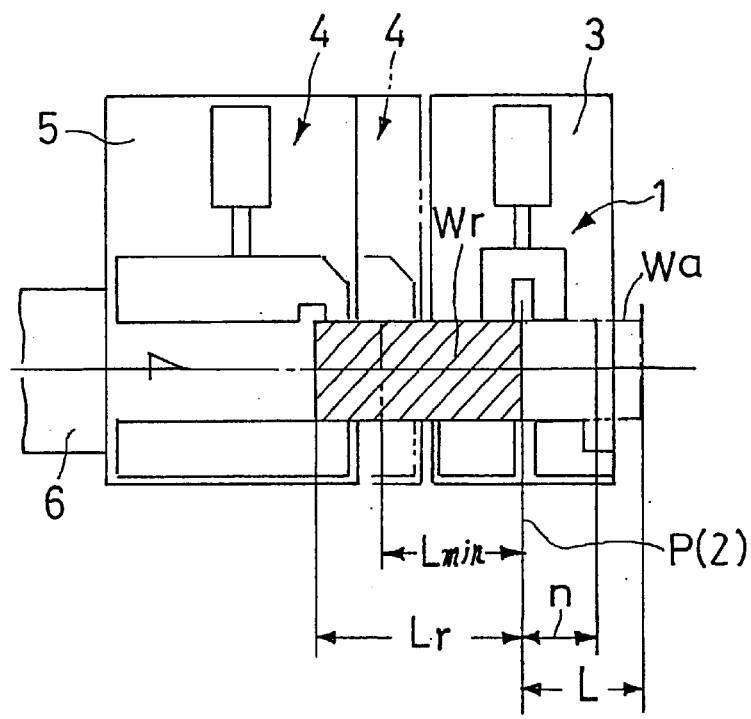
FIG. 12 is a general plan view showing a cutting method by the conventional cutting apparatus.

As shown in FIGS. 1 to 4, in a circular saw cutting machine of the present invention, the main stock vice mechanism 1 and the work feeding stock vice mechanism 4 have the same constructions as those discussed in connection with FIGS. 11 and 12. It should be noted that like components to those shown in FIGS. 11 and 12 will be identified by like reference numerals, and discussion for the construction will be omitted for avoiding redundant discussion and whereby for simplification of disclosure. In FIGS. 1 to 4, the reference numeral 10 denotes a work drawing mechanism provided adjacent the base 3 of the work feeding stock vice mechanism 4. When a difference between the length Lr of the remainder material Wr and the feed limit length $L_{min}$ of the remainder material Wr becomes shorter than a cutting length L of the work (L>Lr-$L_{min}$), the work drawing mechanism 10 holds the tip end of the remainder material Wr with a pair of holding members 11 and 12 for with drawing a predetermined length α=L-(Lr-$L_{min}$) in a work feeding direction. While the shown embodiment has been disclosed in terms of the circular saw cutting machine, the present invention is also applicable for a band saw cutting machine.

Figure 1:
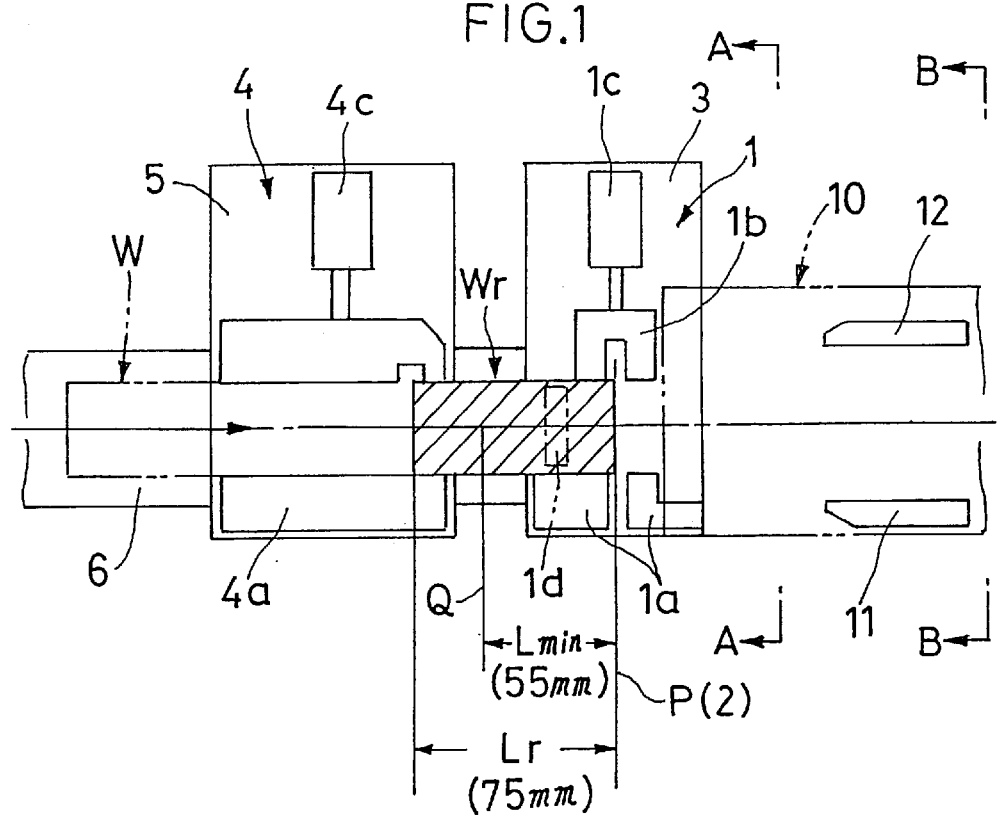
FIG. 1 is a general plan view of a cutting apparatus according to the present invention, showing a condition where a holding member of a work drawing mechanism is placed at a stand-by position.

While the particular construction of the work drawing mechanism 10 will be discussed later, operation of the work drawing mechanism 10 will be, at first, discussed with reference to FIGS. 1 and 4. Now, the feed limit length $L_{min}$ of the work feeding stock vice mechanism 4 is assumed to be 55 mm, for example, and when cutting is performed with taking the cutting length L of the work W at 30 mm, and assuming that the length Lr of the remainder material Wr shown by solid line in FIG. 1 is 75 mm at about end of cutting of one work W according to progress of cutting. The difference between the length Lr of the remainder material and the feed limit length $L_{min}$ of the remainder material Wr by the work feeding stock vice mechanism 4 becomes Lr-$L_{min}$=75 mm-55 mm=20 mm and thus is shorter than the cutting length L (30 mm).

Figure 2:
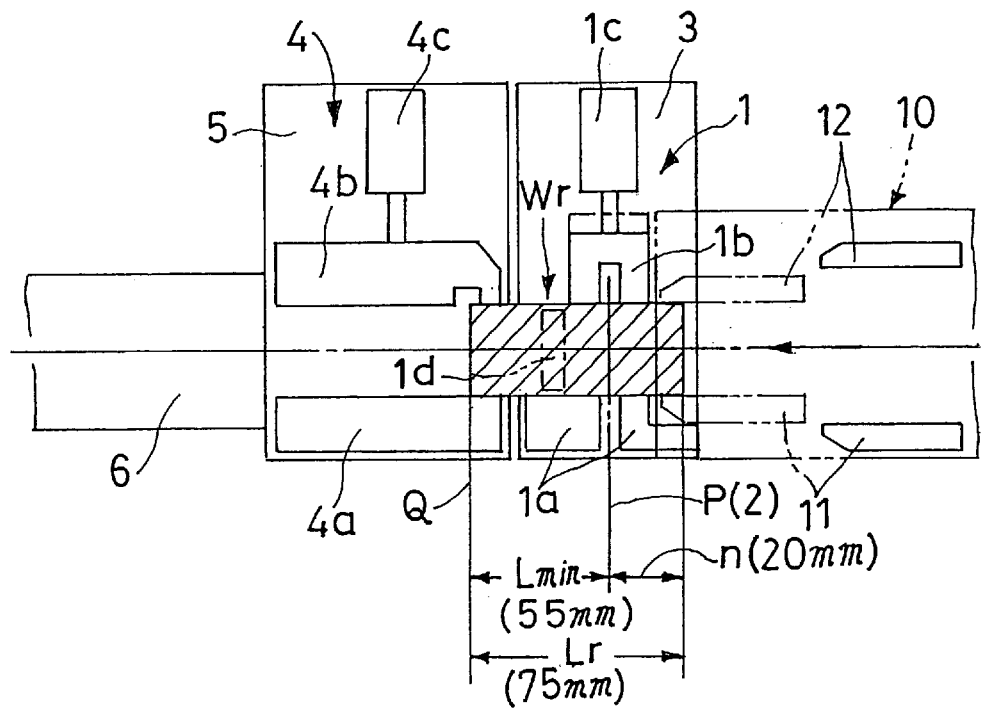
FIG. 2 is a general plan view of a cutting apparatus according to the present invention, showing a condition where a holding member of a work drawing mechanism is about holding the tip end of a remainder material.

As set forth above, when the difference between the length Lr of the remainder material Wr and the feed limit length $L_{min}$ of the remainder material Wr by the work feeding stock vice mechanism 4 becomes shorter than the cutting length L, the remainder material Wr cannot be fed for the cutting length L by the work feeding stock vice mechanism 4 while the remainder material Wr maintains a length to permit cutting at least for one more time. Therefore, at first, the remainder material Wr is fed to the forward limit position Q by the work feeding stock vice mechanism 4 as shown in FIG. 2. It should be noted that the forward limit position Q is the position distanced from the cutting position P in upstream side for 55 mm (feed limit length $L_{min}$). The work feeding stock vice mechanism 4 can move the remainder material Wr forward only up to the forward limit position Q located at upstream side of the cutting position P in the extent of 55 mm due to constraint of the feed limit length $L_{min}$. When the remainder material Wr is fed up to the forward limit position Q by the work feeding stock vice mechanism 4, the actual feed length of the remainder material Wr becomes 20 mm which is shorter than the cutting length in the extent of 10 mm. Accordingly, the remainder material Wr is projected from the cutting position P in the length of 20 mm as shown in FIG. 2.

Figure 3:
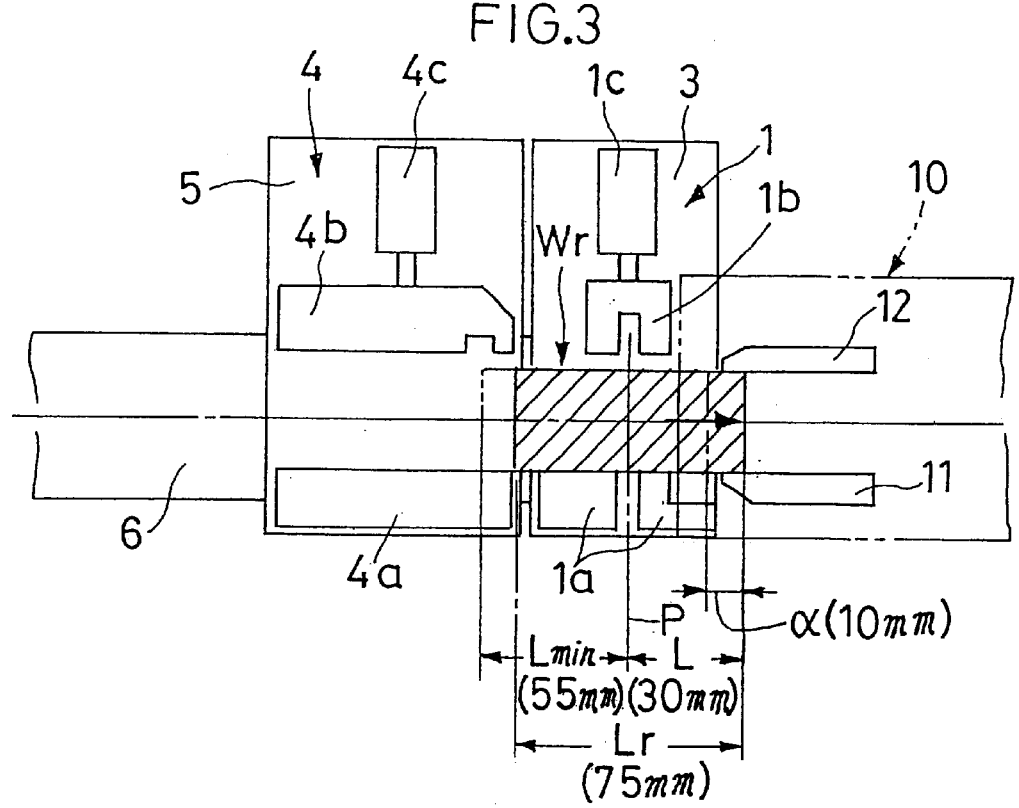
FIG. 3 is a general plan view of a cutting apparatus according to the present invention, showing a condition where a holding member of a work drawing mechanism draws the remainder material for a predetermined length with holding the tip end of the remainder material.

Then, as shown in FIGS. 2 and 3, the holding members 11 and 12 of the work drawing mechanism 10, which are held in stand-by state at the downstream side of the cutting position P, are moved toward the cutting position P for holding the tip end of the remainder material Wr as shown by phantom line in FIG. 2. Then, the holding members 11 and 12 holding the tip end portion of the remainder material Wr is retracted for the length a for the lacking feed length to draw forward in the work transporting direction from the cutting position P. At this time, α is cutting length L-(remainder material length Lr-feed limit length $L_{min}$)=30 mm-(75 mm-55 mm)=10 mm. By this, as shown in FIG. 3, the remainder material Wr is fed for the predetermined cutting length L from the cutting position P.

When the holding members 11 and 12 of the work drawing mechanism 10 hold the tip end portion of the remainder material Wr, the movable stock vice 1b of the main stock vice mechanism 1 is retracted as shown by phantom line in FIG. 2. Then, the remainder material Wr is fixed by a vertical stock vice 1d. Upon drawing the remainder material Wr by holding with the holding members 11 and 12, the vertical stock vice 1d is released. After drawing the work W with holding the tip end with the holding members 11 and 12, the holding members 11 and 12 are released from the remainder material Wr and retracted from the holding position.

Figure 4:
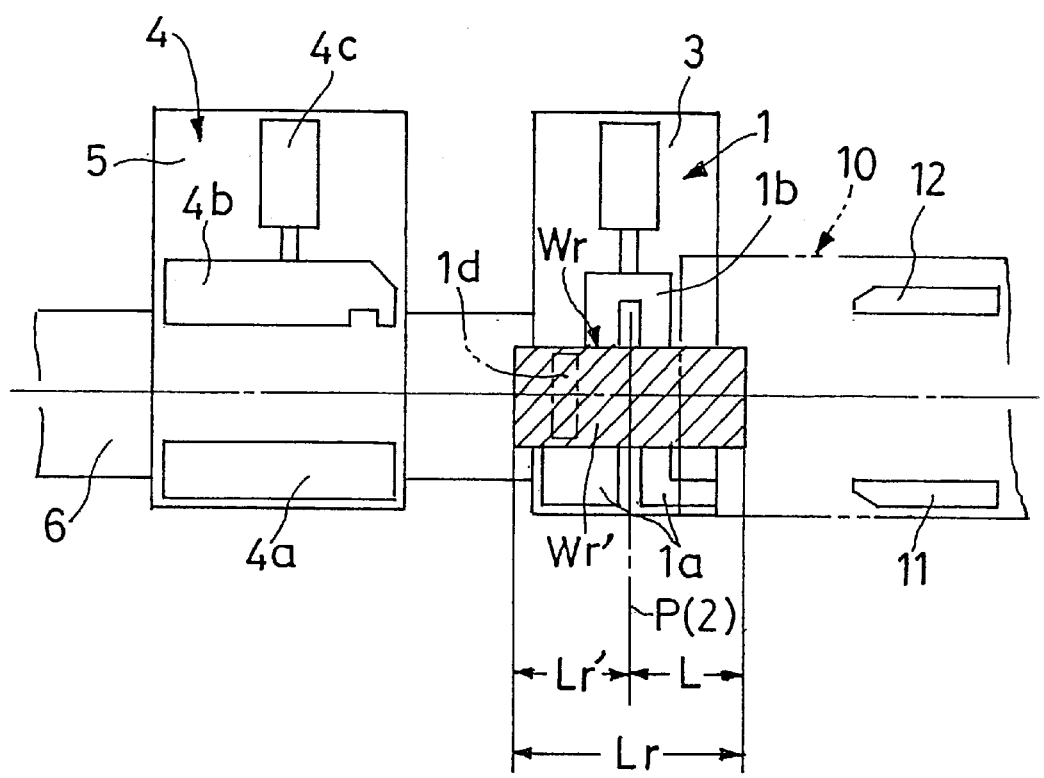
FIG. 4 is a general plan view of a cutting apparatus according to the present invention, showing a condition where a holding member of a work drawing mechanism is returned to the stand-by position after termination of holding of the remainder material.

After drawing the remainder material Wr for a stroke α in the work feeding direction by the work drawing mechanism 10, the remainder material Wr is cut by the saw blade 2 at the cutting position P in the condition held by the main stock vice mechanism 1, as shown in FIG. 4. The remainder material Wr' left after cutting through the process set forth above has a length of 75 mm-30 mm=45 mm which is longer than the cutting length L (30 mm), and is shorter than the feed limit length $L_{min}$. Therefore, as far as the length is concerned, the remainder material Wr' can be cut one more time. However, the remainder material Wr' cannot be fed by the work feeding stock vice mechanism 4 any further. Accordingly, at this time, when the holding members 11 and 12 of the work drawing mechanism 10 can hold the remainder material Wr only at downstream side of the cutting position P, further cutting is impossible. Then, the remainder material Wr' of the length of 45 mm becomes the final remainder material. In contrast to this, when the holding members 11 and 12 of the work drawing mechanism 10 is constructed to permit holding of the tip end of the remainder material at the upstream side of the cutting position P in the work feeding direction from the downstream side thereof, the foregoing remainder material Wr' of the length of 45 mm can be drawn for the cutting length L (30 mm). Therefore, cutting for one more time becomes possible. After cutting, the finally remained material of the length of 15 mm becomes the crop.

On the other hand, when the length (45 mm) of the remainder material Wr' is shorter than the feed limit length (55 mm) but is sufficiently longer than the cutting length L, e.g. when the cutting length L is 10 mm, when the holding members 11 and 12 of the work drawing mechanism 10 is constructed to permit holding of the tip end of the remainder material Wr' (45 mm) at the upstream side of the cutting position P in the work feeding direction from the downstream side thereof, the foregoing remainder material Wr' of the length of 45 mm can be drawn for the cutting length L (10 mm). Therefore, further cutting becomes possible.

Figure 5:
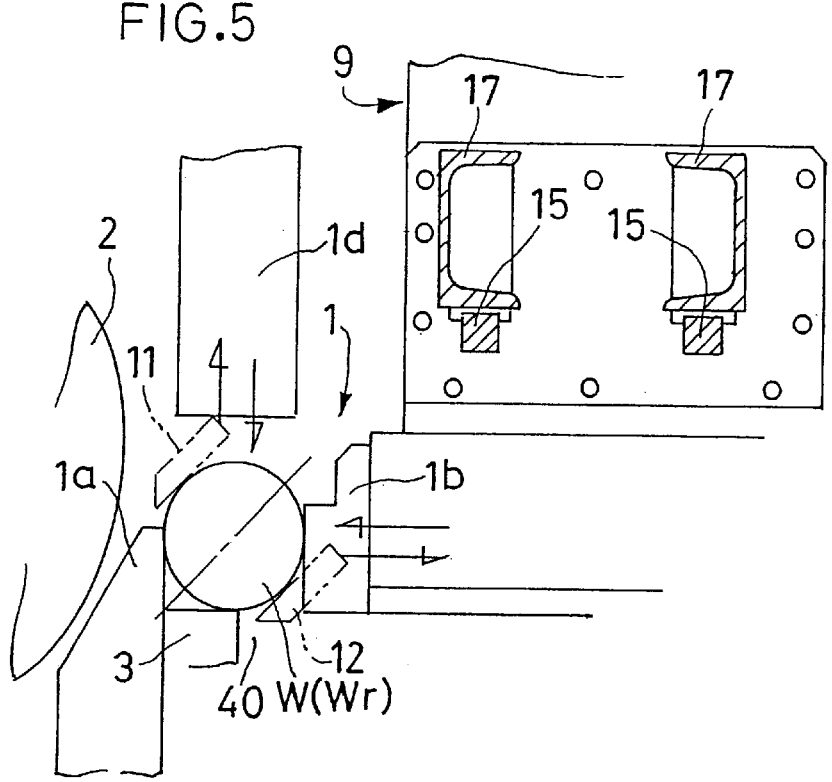
FIG. 5 is an enlarged section taken along line A—A of FIG. 1.
Figure 6:
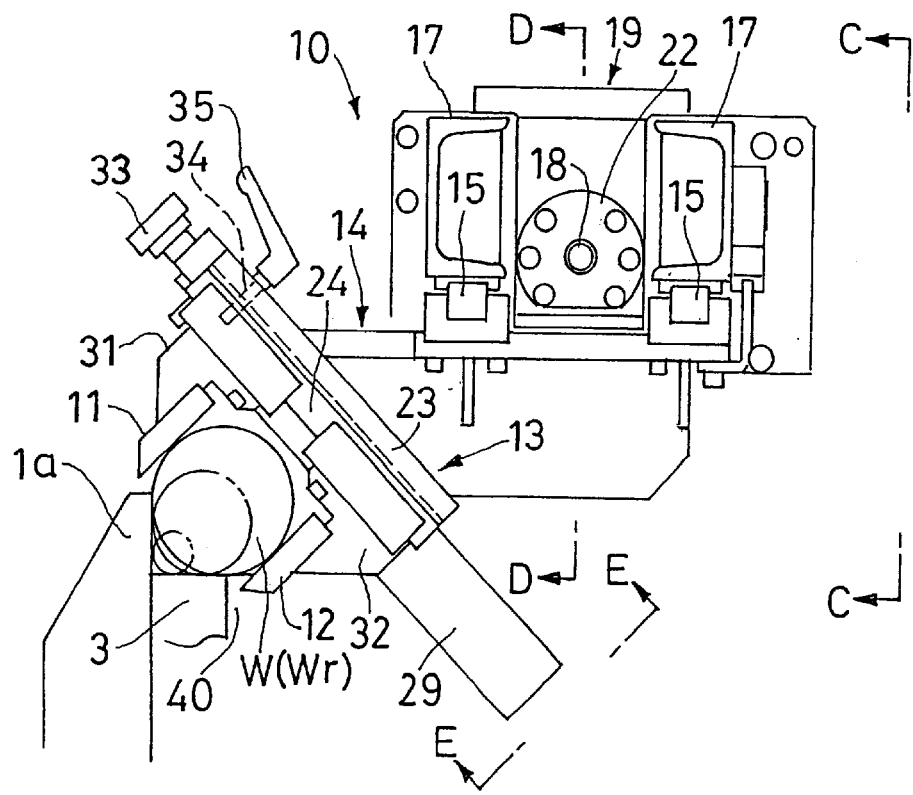
FIG. 6 is an enlarged section taken along line B—B of FIG. 1.
Figure 7:
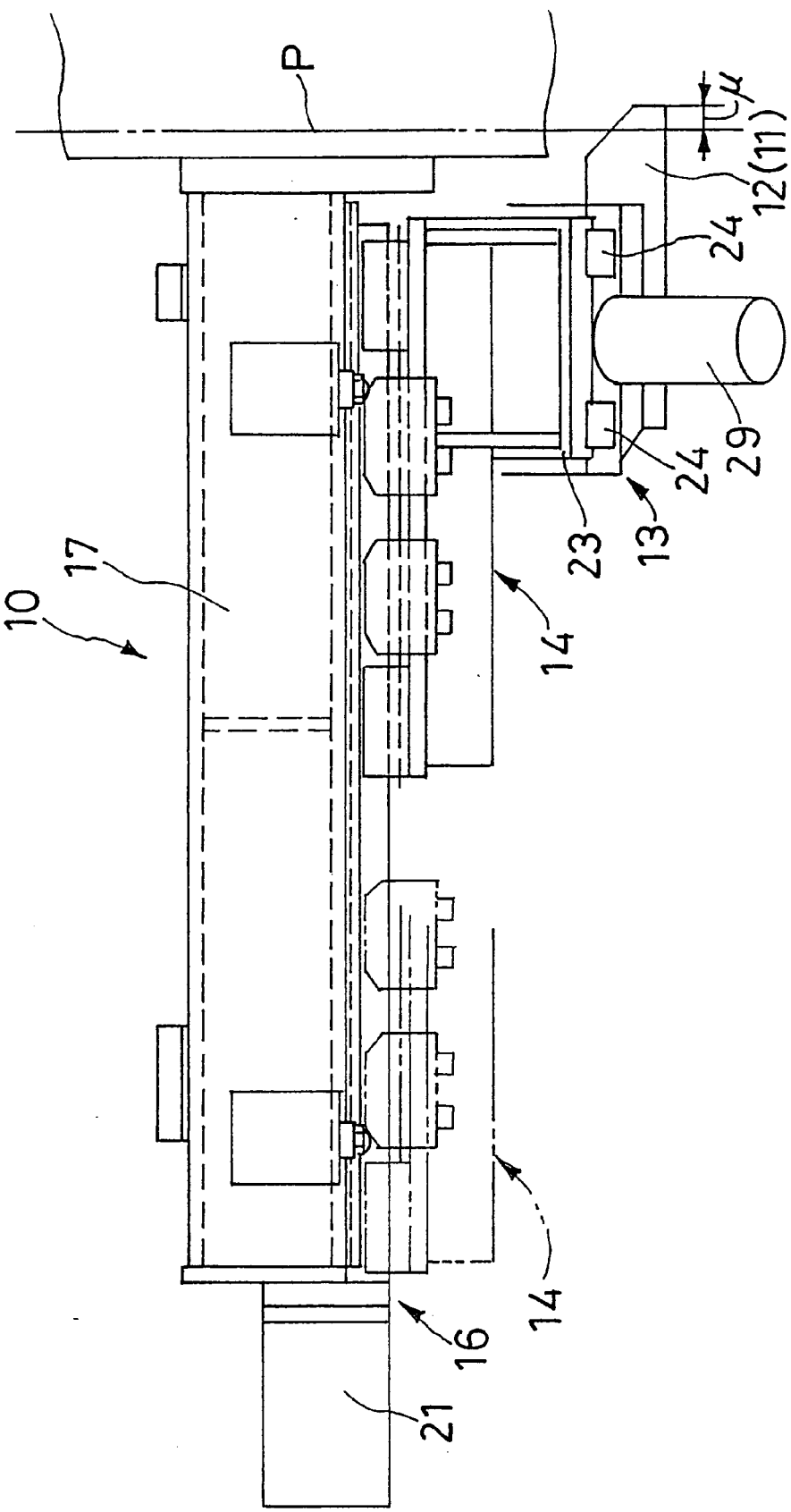
FIG. 7 is an enlarged section taken along line C—C of FIG. 6.
Figure 8:
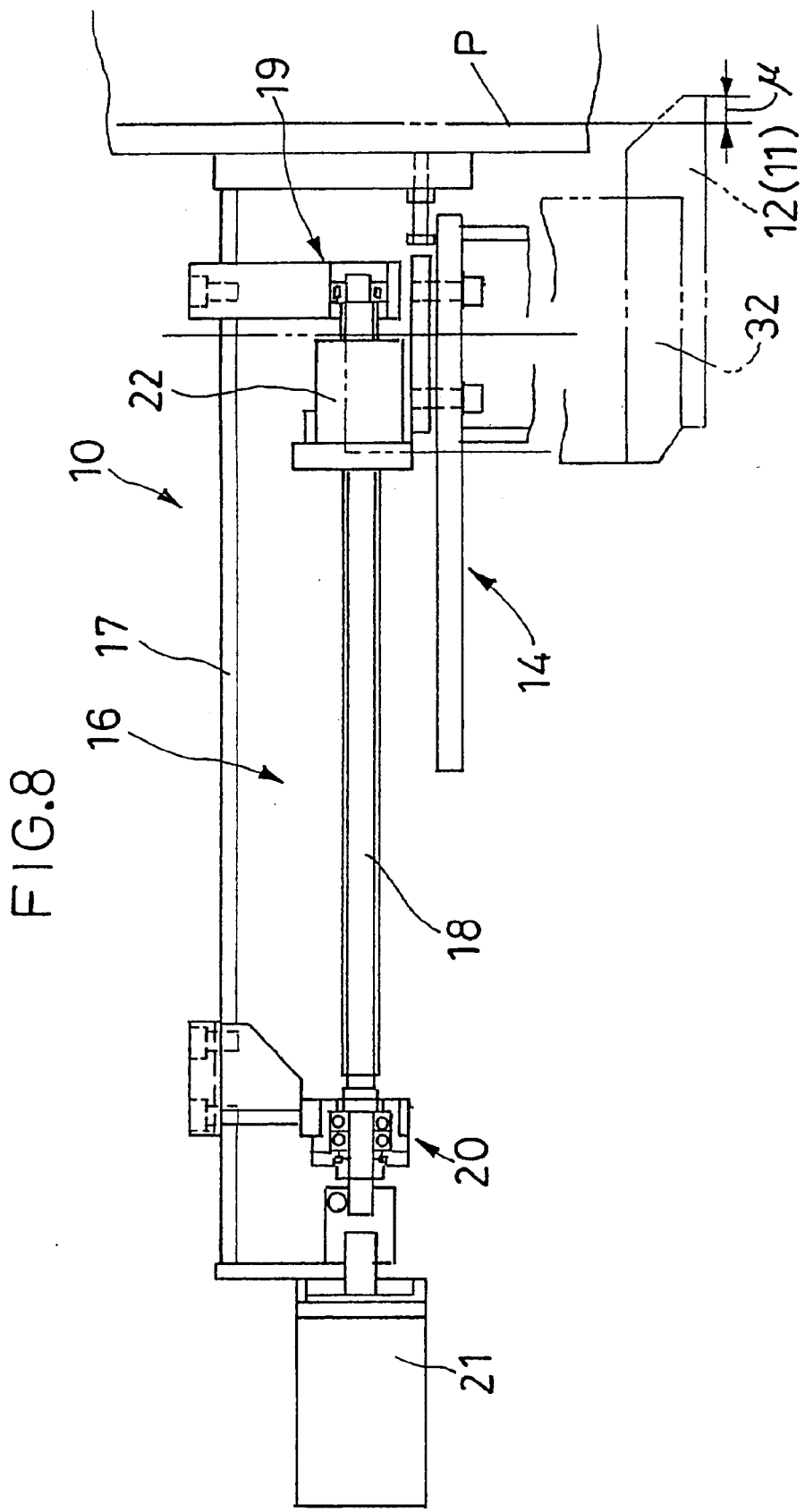
FIG. 8 is an enlarged section taken along line D—D of FIG. 6.
Figure 9:
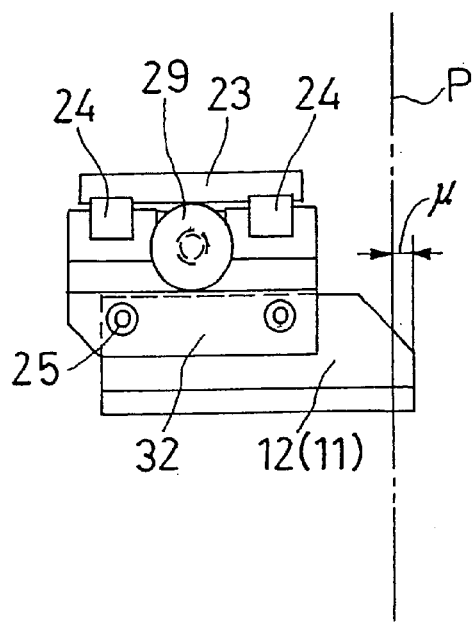
FIG. 9 is an enlarged section taken along line E—E of FIG. 6.
Figure 10:
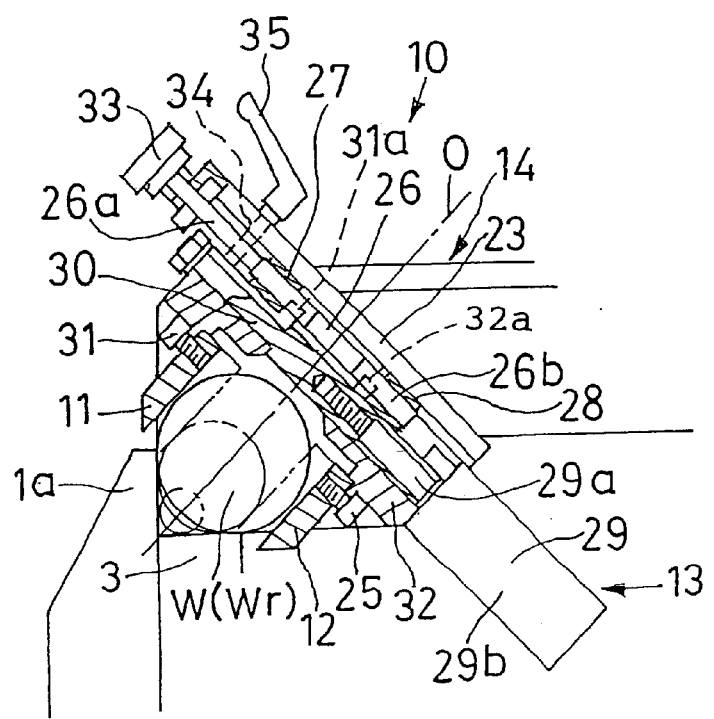
FIG. 10 is a section showing a part of a work drawing mechanism.

Next, particular construction of the work drawing mechanism 10 will be discussed with reference to FIGS. 5 to 11. FIG. 5 is an enlarged section taken along line A—A of FIG. 1, FIG. 6 is an enlarged section taken along line B—B of FIG. 1, FIG. 7 is an enlarged section taken along line C—C of FIG. 6, FIG. 8 is an enlarged section taken along line D—D of FIG. 6, FIG. 9 is an enlarged section taken along line E—E of FIG. 6, and FIG. 10 is a section showing a part of a work drawing mechanism. The work drawing mechanism 10 is constructed with a movable frame 14 provided with a pair of holding members 11 and 12 holding the work W at both sides in diametric direction and driving means 13 for driving the holding members 11 and 12 between a closed position for holding the work W and an open position releasing the work, and a movable frame driving means 16 (FIG. 7) for driving the movable frame 14 along a pair of guide rails 15 and 16 extending in parallel with the transporting direction of the work W toward and away from the cutting position P from a predetermined position located downstream side of the cutting position P.

As shown in FIGS. 5 and 7, on a machine frame 9 of the cutting apparatus, a pair of support frames 17 extending in parallel with the transporting direction of the work W are fixed at one ends at position in the vicinity of the work feeding stock vice mechanism 4. Along lower surface side of both support frames 17, a pair of guide rails 15 are arranged. On the guide rails, the movable frame 14 is slidably supported. As shown in FIGS. 6 and 8, the movable frame driving means 16 has a screw shaft 18 arranged between a pair of guide rails 15 and in parallel relationship therewith. The screw shaft 18 is rotatably supported by bearing members 19 and 20 which are mounted on both guide rails 15. The screw shaft 18 is driven in forward and reverse directions by a servo motor 21. Then, a nut member 22 is threadingly engaged with the screw shaft 19. On the nut member 22, the movable frame 14 which is guided by a pair of guide rails 15, is integrally mounted. Accordingly, by forward and reverse revolution of the servo motor 21, the movable frame 14 is moved from a stand-by position shown by a phantom line at the left side of FIG. 7 and a shifted position as shifted from the stand-by position toward the cutting position P as shown by solid line at the right side of FIG. 7.

As shown in FIGS. 6, 9 and 10, at the stroke end of the movable frame 14 shifted toward the cutting position P, a mounting base plate 23 is fixedly mounted in tilted fashion with a tilt angle of 45° with respect to a horizontal surface. On the lower surface side of the mounting base plate 23, a pair of parallel guide rails 24 extending in a direction perpendicular to the transporting direction of the work W, are arranged. On both guide rails 24, a pair of brackets 31. and 32 are slidably mounted at opposite sides across a center portion O in the longitudinal direction. On these brackets 31 and 32, the holding members 11 and 12 are mounted by means of fastening bolts 25, respectively.

On the other hand, between both guide rails 24 arranged on the lower surface side of the mounting base plate 23, a screw shaft 26 is rotatable arranged in parallel relationship with the mounting base plate 23, as shown in FIG. 10. The screw shaft 26 is formed with inverse helical portions 26a and 26b at both sides across the central portion in the longitudinal direction. To the inverse helical portions 26a and 26b, nuts 27 and 28 are threadingly engaged in a condition where rotation is restricted. Between opposing end portions of both nuts 27 and 28, engaging pieces 31a and 32a forming parts of both brackets 31 and 32 are extended. The engaging pieces 31a and 32a are not restricted movement in the direction approaching to each other but are restricted movement in the direction away from each other. Through both brackets 31 and 32, an actuation shaft 30 is extended in parallel to the screw shaft 26. The actuation shaft 30 is integrally connected with a piston rod 29a of an air cylinder 29 for driving the holding members 11 and 12 between opening and closing positions. The tip end of the actuation shaft 30 is fixed to one bracket 31, and a cylinder tube 29b of the air cylinder 29 is fixed to the other bracket 32. On one end portion of the screw shaft 26, a gripper 33 for rotating the screw shaft 26 is mounted. It should be noted that, in FIGS. 6 and 10, the reference numeral 34 denotes a lock bolt for locking the screw shaft 26 at a predetermined rotated position, and 35 denotes a handle for rotating the lock bolt 34.

Upon opening and closing the holding members 11 and 12, at first, opening limit positions of both holding members 11 and 12 are set depending upon diameter of the work W. Namely, the screw shaft 26 is rotated in forward and reverse direction by the gripper 33 for operating operation, a distance between the nuts 27 and 28 is determined as desired. When the diameter of the work W is large, the distance between the nuts 27 and 28 is set to be wide. On the other hand, when the diameter of the work W is small, the distance between the nuts 27 and 28 is set to be narrow. In FIG. 10, there is shown the case where the diameter of the work is large. From the condition shown in FIG. 10, when the air cylinder 29 is actuated to expand, the holding member 11 on the side of the bracket 31 which is connected to the piston rod 29a, contacts with the side surface of the work W. Immediately after this, the holding member 12 on the side of the bracket 32 connected to the cylinder tube 29b comes into contact with the opposite side surface of the work W to close the holding members 11 and 12 to hold both side surface to fix the work W thereon. At this time, the engaging pieces 31a and 32a of both brackets 31 and 32 are moved toward each other and away from opposing end surfaces of both nuts 27 and 28 at opening limit positions.

When the air cylinder 29 is actuated to expand in the condition where the holding members 11 and 12 are placed in closed position for holding the work W therebetween, the both holding members 11 and 12 are opened to release the work W. At this time, the engaging pieces 31a and 32a of both brackets 31 and 32 abut onto opposing end faces of the nuts 27 and 28 located at opening limit positions, respectively to restrict further opening motion. It should be noted that the driving means 13 is constructed with the air cylinder 29, the actuation shaft 30 and both brackets 31 and 32.

In the operation for drawing the remainder material Wr in feeding direction of the work by the pair of holding members 11 and 12 in the extent of α of the lack of feeding by the work feeding stock vice mechanism 4, after moving the movable frame 14 from the stand-by position and stopping at the shifted position, by actuation of the driving means 13, the holding members 11 and 12 holds the tip end portion of the remainder material Wr. Then, the movable frame driving means 16 is actuated to retract the movable frame 14 from the forward limit position for a length $f_i$ to temporarily stop. During this period, the driving means 13 is actuated to open the holding members 11 and 12 for releasing the remainder material Wr. The movable frame 14 is driven by the movable frame driving means 16 to be retracted to the stand-by position, and stopped at the stand-by position. This operation is as discussed in connection with FIGS. 1 to 4.

On the other hand, as shown in FIGS. 7 to 9, when the movable frame 14 is shifted from the stand-by position and stopped at the forward limit position, the tip end portions of the holding members 11 and 12 extend toward the upstream side across the cutting position P from the downstream side thereof, in the extent of $\mu$. At the position extended toward the upstream side, the holding members 11 and 12 hold the tip end of the remainder material Wr. At this point, as set forth above, even when the length of the remainder material Wr' is shorter than the feed limit length $L_{min}$ (see FIG. 4), if it is sufficiently longer than the cutting length L, such remainder material Wr' can be drawn to extend toward downstream side from the cutting position P in the extent corresponding to the cutting length L by means of the holding members 11 and 12 by constructing the holding members 11 and 12 to extend toward the upstream side across the cutting position and holding the tip end of the remainder material Wr' at the extended position. The cutting at the predetermined cutting length becomes possible to shorten the final length of the remainder material to be crop.

In this case, the length μ to extend the holding members 11 and 12 across the cutting position P may be about 10 mm, for example.

On the other hand, as shown in FIGS. 5 and 6, a pair of holding members 11 and 12 are placed in opposition to each other at tilted position away from obliquely upward from the stationary stock vice 1a and the base 3 so as not to cause interference with the stationary stock vice 1a of the main stock vice mechanism 1 upon holding the work W (remainder material Wr). If a pair of holding members 11 and 12 are arranged in horizontal direction, one holding member 11 may collide on the stationary stock vice 1a of the main stock vice mechanism 1 to make it impossible to place the holding members close to the cutting position P. Accordingly, as shown in FIGS. 5 and 6, the holding members 11 and 12 are arranged so that one holding member 11 is placed at higher level than the stationary stock vice 1a and the other holding member 12 is placed at lower level than the stationary stock vice 1a. On the other hand, by employing such arrangement, both holding members 11 and 12 can be placed quite close position to the cutting position P from the downstream side in the work feeding direction, and further to extend toward the upstream side across the cutting position P. Thus, even when the length of the remainder material Wr or Wr' is shorter than the feed limit length, the tip end of the remainder material Wr or Wr' can be certainly held.

It should be noted that upon holding the remainder material Wr by the holding members 11 and 12, the remainder material Wr can be held by the stationary stock vice 1a of the main stock vice mechanism 1 and the vertical stock vice 1d, to maintain the movable stock vice 1b at the retracted position. Since the vertical stock vice 1d is located sufficiently distant from the cutting position P, the holding member 12 will never interfere with the movable stock vice 1b or the vertical stock vice 1d. On the other hand, on the base 3, a recessed portion 40 is formed on the side of the movable stock vice 1b as shown in FIGS. 5 and 6. Therefore, the base 3 may not cause interference with the holding member 12.

A sequence of the remainder material drawing operation by the work drawing mechanism 10 set forth above is performed automatically by a control unit which controls operations of the driving means 13 and the movable frame driving means 16 on the side of the work drawing mechanism 10, and the main stock vice mechanism 1 and the work feeding stock vice mechanism 4 on the side of the cutting apparatus, associating therewith. The control unit is mainly constructed with a microcomputer.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A cutting apparatus comprising:
   (a) a base structure;
   (b) a work piece cutting means mounted on said base structure and defining a cutting position;
   (c) a main stock vice mechanism mounted on said base structure and including elements for gripping and holding stationary a work piece to be cut at positions closely adjacent to said cutting position during cutting of said work piece by said cutting means;
   (d) a work piece feeding vice mechanism movably mounted on said base structure and positioned on an upstream side of said cutting position;
   (e) said work piece feeding vice mechanism including elements for gripping and advancing the work piece incrementally a predetermined cutting length toward and beyond said cutting position; and
   (f) a work piece drawing mechanism mounted on said base structure and active when a difference between a remainder length of said work piece and a feed limit length of said work piece feeding stock vice mechanism becomes shorter than said predetermined cutting length of said work piece;
   (g) said work piece drawing mechanism comprising opposed holding elements for gripping and holding a forward end portion of said remainder length at a predetermined position on a downstream side of said cutting position or on an upstream side of said cutting position for drawing said remainder length in a downstream direction to extend said work piece by said predetermined cutting length from said cutting position.

2. A cutting apparatus comprising:
   (a) a base structure;
   (b) a work piece cutting means mounted on said base structure and defining a cutting position;
   (c) a main stock vice mechanism mounted on said base structure and including elements for gripping and holding a work piece to be cut on upstream and downstream sides of said cutting position during cutting of said work piece by said cutting means;
   (d) a work piece feeding stock vice mechanism movably mounted on said base structure and including elements for gripping and holding said work piece and periodically advancing said work piece toward said cutting position for sequentially cutting predetermined cutting lengths of said work piece; and
   (e) a work piece drawing mechanism mounted on said base structure and active when a remainder length of said work piece is shorter than a work feed limit of said work piece feeding mechanism and longer than said predetermined cutting length;
   (f) said work piece drawing mechanism including a pair of holding elements for gripping and holding a forward end of said remainder length at a predetermined position on a downstream side of said cutting position or on an upstream side of said cutting position to extend said work piece said predetermined cutting length from said cutting position.

3. A cutting apparatus as set forth in claim 1, wherein said work piece drawing mechanism comprises:
   (a) a movable frame carried by said base structure and including said pair of holding elements for holding said work piece on opposite sides in a diametrical direction;
   (b) driving means for driving said holding elements between a closed position holding said work piece and an open position where said work piece is released; and
   (c) a movable frame driving means for driving said movable frame from a position downstream of said cutting position toward said cutting position,
   (d) wherein said movable frame is controllably driven toward said cutting position to place said holding elements at position for engaging and holding the forward end of said remainder length.

4. A cutting apparatus as set forth in claim 3, wherein (a) said main stock vice mechanism comprises a stationary stock vice element and a movable stock vice element, (b) said pair of holding elements of said work piece drawing mechanism are arranged obliquely with respect to said main stock vice mechanism, with one of said holding elements being positioned obliquely upward with respect to said stationary stock vice element, so as not to cause interference with said stationary stock vice element upon gripping of said remainder length by said holding elements.

5. A cutting apparatus as set forth in claim 2, wherein said work piece drawing mechanism comprises:

(a) a movable frame having a pair of holding elements for gripping and holding said work piece from both sides in a diametrical direction;

(b) driving means for driving said holding elements between closed positions gripping said work piece and open positions wherein said work piece is released; and (c) a movable frame driving means for driving said movable frame from a position downstream of said cutting position toward said cutting position, (d) said movable frame being driven toward said cutting position to place said holding elements at a position for engaging and holding the forward end of said remainder length.

6. A cutting apparatus as set forth in claim 5, wherein (a) said pair of holding elements of said work piece drawing mechanism are arranged obliquely with respect to said main stock vice mechanism, with one of said holding elements being positioned obliquely upward with respect to said stationary stock vice element, so as not to cause interference with said stationary stock vice element upon gripping of said remainder length by said holding elements.

* * * * *